UNITED STATES PATENT OFFICE 2,217,358

INSECTICIDE AND FUMIGANT

Willem Coltof, Amsterdam, Netherlands, assignor to Shell Development Company, San Francisco, Calif., a corporation of Delaware No Drawing. Application April 25, 1939, Serial No. 269,979. In the Netherlands May 24, 1938

9 Claims. (Cl. 167—22)

This invention relates to new and useful insecticides and fumigants.

I have found that alkene thiohalohydrins such as ethylene thiochlorhydrin, ethylene thiobromhydrin, propylene thiochlorhydrin, 3-bromo propyl mercaptan, 2-thiol trimethylene chloride, 2-chloro trimethylene thioglycol, and the like, either alone or in admixture with other substances, are particularly suitable for combating many forms of insects and lower animal life. In general those thiohalohydrins containing from 2 to 6 carbon atoms, and containing a halogen atom and thiol group attached to adjacent carbon atoms, such as in the above-mentioned compounds, are most suitable and preferred. These materials, I have found, are highly toxic to many insects such as, in particular, a large variety of weevils, beetles and moths, and when applied in closed spaces, destroy most lower animals, such as, in particular, mice, rats and other rodents.

Aside from their high effectiveness in exterminating and controlling various insects and animal pests, the present materials have certain other advantages which make them especially suitable. For example, in the combating of rodents they have the advantage over carbon disulfide (commonly used for this purpose) of being much less inflammable. Furthermore, they are superior to prussic acid and similar very toxic fumigants in combating rodents in that with the present agents the animals are found to die several minutes after being subjected to the vapors, and therefore do not, in general, die in inaccesible corners, etc., of the fumigated area. The animals after being subjected to the vapors for only a short period do not recover, in general, upon being brought into fresh air, and after a period of a few minutes, depending upon the particular agent employed, the size of the animal, the concentration of the agents, and the time of subjection, they develop sudden spasms which occur irregularly, and finally die.

The present agents are also superior for many purposes since they do not tend to polymerize, and do not, therefore, tend to leave a deposit of polymer on the material treated, such as is the case with such compounds as ethylene sulfide.

Since the present agents all possess a characteristic and easily recognizable odor, they are considerably more safe to use. Furthermore, I have proven that, in spite of what might sometimes be inferred from the literature, these compounds do not have any appreciable deleterious effect upon the human skin, and may be used and handled without risk.

In view of the effectiveness and advantages of the present agents, they are particularly adapted to be applied in combating insects and rodents in warehouses, ships, docks, wharves, basements, attics, etc., and may be applied by unskilled hands.

While the present agents may be applied alone with excellent results, they may also be employed in combination with other active insecticides, fungicides, herbicides, rodenticides, and/or bactericides. Thus, for example, they may be combined, if desired, with Bordeaux mixture, copper sulfate, copper carbonate, sulfur, mercury compounds, sodium arsenite, iron sulfate, phenol, para-dichlorbenzene, nicotine dust, unsaturated chlorides, alkene sulfides, organic thiocyanates, thiuram sulfides, esters of formic acid, and the like, to form pest-combating agents for numerous special purposes.

The present agents, either alone or in combination with other active or inactive substances, may be applied by spraying, dusting, pouring, dipping, etc., in the form of concentrated liquids, solutions, aqueous emulsions, suspensions, dusting powders, and the like, containing such concentrations of the active principle as are most suited for the particular purpose at hand. They may be applied, for example, in the form of dilute solutions in a suitable solvent or mixture of solvents containing, for instance, petroleum distillates, lignite tar oils, hydrogenated hydrocarbons, paraffin oils, naphthenes, chlorinated hydrocarbons, chlorinated ethers, fenchyl alcohol, mono- and polyhydric alcohols, glycol ethers, or the like, or mixtures thereof. As will be readily apparent, the particular choice of thio halohydrin and solvent, or sovent mixture, will depend considerably upon the particular use for which the material is intended.

If it is desired to apply the agent in the form of an emulsion, it is usually desirable to incorporate into the toxic concentrate, or into the aqueous phase, a small amount of an emulsifying agent, such as, for instance, saponified sulfonated fish oil, saponified fatty acid, Turkey red oil, saponified hydroxy ethylene sulfate, saponified sulfated resin, isopropyl naphthylene sulfonic acid, sulfonium sulfates, sulfated higher alcohols, sodium oleate, aluminum stearate, resin soaps, amine soaps, starch, gum ghatti, gum tragacanth, or the like. The emulsifying agent, in many cases, may not only facilitate the formation of the emulsion, but also act as a spreading agent.

If it is desired to apply the agents in the form of a dusting powder, the toxic principles, solution thereof, or mixture containing the same, may be thoroughly incorporated with a suitable absorbent material of the desired state of subdivision, such as diatomaceous earth, fuller's earth, wood flour, sawdust, ground rice chaf, activated bauxite, activated charcoal, or the like, to give a material of the desired handle which may be applied by hand or power driven dusting machines, hand bellows, or the like.

Other materials which may be employed in conjunction with the present active principles to produce pest-combating agents for various purposes are fixatives such as casein, dextrin, gum karaya, gum arabic, gum dammar, locust bean flour, glue, gelatin, heavy petroleum oils, lanolin, resin waxes, and the like, and odorants such as isobornyl acetate, terpineol, d-pinene, d-camphene, sylvestrene, cedar oil, cypress oil, camphor oil, and the like.

In such cases where an efficient fumigating action is desired, I preferably employ those thiohalohydrins which have the higher vapor pressures at room temperature, such as, for instance, ethylene thiochlorhydrin. Those agents having lower vapor pressures, such as 2-chlorotrimethylene thioglycol, and the like, are more efficient as contact insecticides.

To illustrate the effectiveness of the present agents, it may be mentioned that in combating calandra granaria (grain weevil), in practice, 10 grams of ethylene thiochlorhydrin per cubic meter kills all the insects within 24 hours. A white mouse is killed in about 10 to 12 minutes when subjected to a concentration of 0.2 cc. per liter.

I claim as my invention:

1. An insecticide and fumigant composition containing as a toxic principle an alkene halogen thiol containing from 2 to 6 carbon atoms.

2. An insecticide and fumigant composition containing as a toxic principle an alkene halogen thiol containing from 2 to 6 carbon atoms, and containing a halogen atom and thiol group attached to adjacent carbon atoms.

3. An insecticide and fumigant composition containing as a toxic principle an alkene chloro thiol containing from 2 to 6 carbon atoms.

4. An insecticide and fumigant composition containing as a toxic principle an alkene chloro thiol containing from 2 to 6 carbon atoms and containing a chlorine atom and thiol group attached to adjacent carbon atoms.

5. An insecticide and fumigant composition containing as a toxic principle an ethylene halogen thiol.

6. An insecticide and fumigant composition containing as a toxic principle a propylene halogen thiol.

7. An insecticide and fumigant composition containing as a toxic principle ethylene thiochlorhydrin.

8. An insecticide and fumigant composition containing as a toxic principle propylene thiochlorhydrin.

9. An insecticide and fumigant composition containing as a toxic principle ethylene thiobromhydrin.

WILLEM COLTOF.